Figure 1:
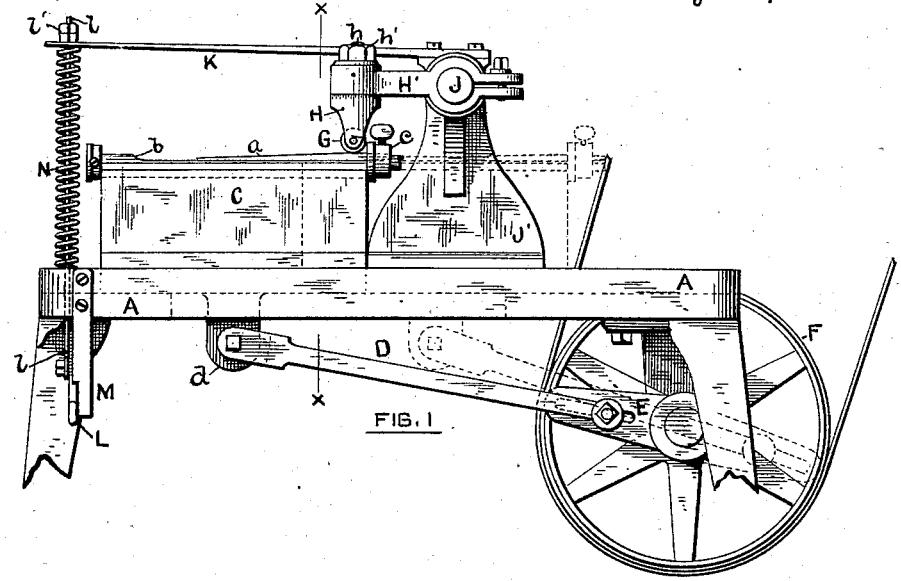

(No Model.)

W. T. NICHOLSON.
MACHINE FOR AND METHOD OF CUTTING TEETH UPON FILE BLANKS.

No. 278,169. Patented May 22, 1883.

WITNESSES:
W. H. Thurston.
J. Knight.

INVENTOR.
Wm. T. Nicholson.

UNITED STATES PATENT OFFICE.

WILLIAM T. NICHOLSON, OF PROVIDENCE, RHODE ISLAND.

MACHINE FOR AND METHOD OF CUTTING TEETH UPON FILE-BLANKS.

SPECIFICATION forming part of Letters Patent No. 278,169, dated May 22, 1883.

Application filed March 3, 1882. (No model.)

*To all whom it may concern:*

Be it known that I, WILLIAM T. NICHOLSON, of the city and county of Providence, and State of Rhode Island, have invented a new and Improved Machine for and Method of Cutting Teeth upon File-Blanks; and I do hereby declare that the following specification, taken in connection with the accompanying drawings, forming a part of the same, is a full, clear, and exact description thereof.

It has long been known in the mechanic arts that figures and designs cut upon a hardened-steel cylinder in intaglio and in relief can be transferred to a softer metal by causing such figure-cylinder to be applied, under pressure, to the surface of the metal to which such design is to be transferred. It is also well known that steels for sharpening knives, commonly classed as "butchers' steels," can be fluted or have their surfaces formed into alternate longitudinal grooves and comparatively-sharp edge lands, as the result of a transferring process, by pressing against the soft surface of a "steel" blank while it is revolving upon its axis a corresponding toothed milling-wheel of hardened steel, the teeth of which are arranged parallel with the surface of the blank, and by causing such milling-wheel to be traversed lengthwise of the blank in a direction also parallel with the surface of the latter.

My invention consists in so modifying this known transferring process as to adapt it for the production of fine files, the teeth of which number, say, fifty to the inch, and upward. If a cylinder of hardened steel the surface of which is furnished with teeth corresponding in form with the teeth which it is intended the file shall have be applied under pressure to the surface of a soft file-blank, and the one be made to traverse relatively to the other, teeth will indeed be formed on the latter, but they will not be suitable for doing good filing, for the reason that their tops or cutting-edges will not be as sharp as it is necessary they should be for file-teeth. The required degree of sharpness of edge cannot practically be obtained by simply molding the teeth of a file by means of a generating-tool pressed against the surface of a traveling blank when such tool revolves on an axis which is at right angles with the path of movement of and the axis of the file-blank. The front or abrupt face of a file-tooth should make an acute angle with the back or slanting face of the same tooth, so as to form a cutting-edge at the junction of the two faces; but a revolving tooth-generating tool, arranged to revolve as above stated, will have a tendency to produce teeth the tops of which are blunt or approximate in the curves of their faces by reason of the general curvature of most file-blanks from heel to point to the epicycloidal curve.

I have discovered that if a small cylinder of hardened and tempered steel is furnished with alternate teeth and depressions, counterparts of the teeth and depressions which it is desired a file should have, and is caused, under suitable pressure applied to it, to traverse the soft surface of a file-blank, or vice versa, in the direction of the longitudinal axis of the blank, while the vertical planes in which the said cylinder revolves are oblique to a vertical plane passing through the axis of the file-blank, the teeth which are thus formed on the file-blank are made sharp as to their tops or cutting-faces, as the result of inclining the axis upon which the tooth-generator revolves relatively to the longitudinal axis of and path of movement of the file-blank away from a right angle. A shearing or draw-cut movement is thus obtained, the effect of which is, as I have ascertained from practical experience in the manufacture of files by this method, to make the meeting faces of the teeth of a figure which renders their common edge sharp and suitable in form for file-teeth. By this means I am able with great economy to produce files of the greatest degree of fineness in numbers of teeth to the inch, which in excellence of quality it would be impossible to obtain by the usual process of chisel-cutting.

Figure 2:
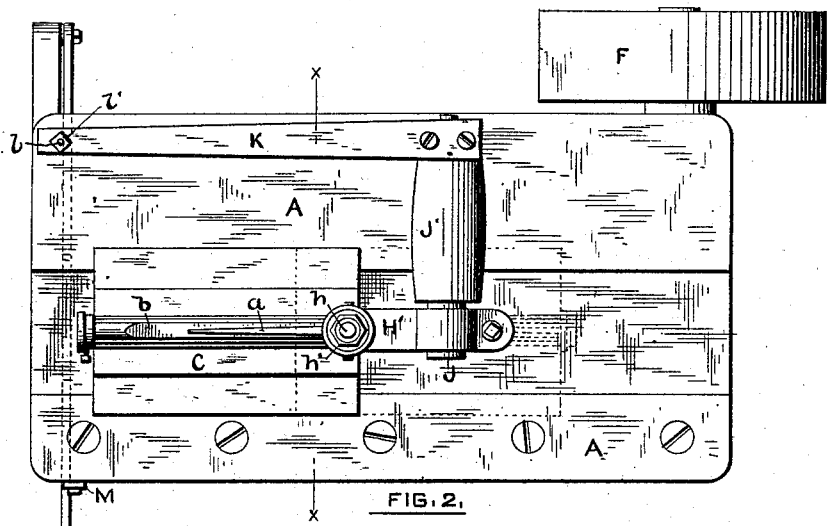
Figures 3, 4:
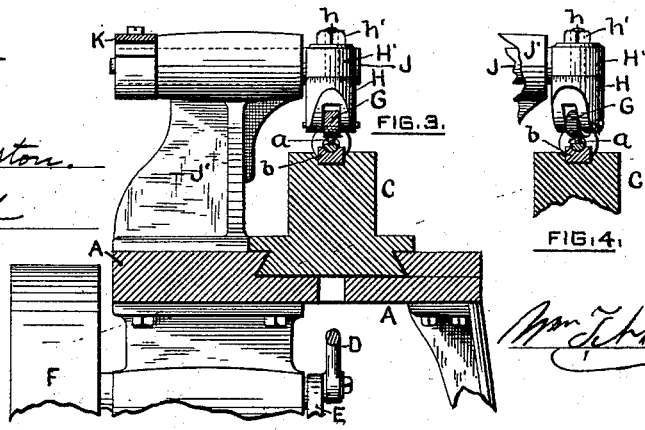

The machinery by which my improvement in the art of forming teeth upon file-blanks can be carried out is illustrated at Figure 1 of the drawings in side elevation. Fig. 2 shows a top view of the same. Fig. 3 represents a transverse section on line *x x*. Fig. 4 shows a modification hereinafter to be referred to.

A represents a suitable frame to support the parts of the machine. The file-blank to be cut is represented at *a*. It is supported upon a bed, *b*, which is capable of rocking transversely to enable the surface of the file to conform to the surface of the tooth-forming tool, and which is commonly known among file-makers as a "rolling-bed." The file-blank is in any proper and convenient way secured to this bed, as shown by the clamping device c at Fig. 1. The rolling-bed is in turn secured against endwise movement in a bed-piece, C, in a well-known way. The bed C, bearing the rolling-bed and the blank to be cut, has a reciprocatory movement given to it by means of a pitman, D, which is pivoted at one end to an ear-piece, d, projecting from the under side of the bed, and at the other end to a crank, E, on the pulley F, the throw of which crank can be made adjustable to suit file-blanks of different lengths.

The tool G, for forming the file-teeth on the surface of the blank, is a cylinder of hardened steel, the length of which is as great as the widest portion of the blank upon which such tool is designed to act. Its periphery is furnished with teeth, the salient faces of which correspond in form with the depressions or spaces between the teeth to be made on the file-blank, and its depressed portions correspond in form with the form which the teeth on the file are to have. These teeth on the steel cylinder or generator G may be placed thereon at the same angle with relation to its axis, as shown at Fig. 3, as the teeth to be formed on the blank are intended to occupy with relation to the axis of the blank, in which case the axis of revolution of the generator will be at right angles with the longitudinal axis of the file-blank and its path of movement, and the teeth formed upon the surface of the blank will, for the reasons before given, be imperfect on account of their blunted edges. It will therefore become necessary, in order to apply my invention, to change slightly the angle of the axis of the generator to the axis of the blank, and cause it in this new relation to be rolled under pressure over the toothed blank, and re-form and sharpen the tops of the teeth already made by the draw-cut action of the teeth of the generator when working under these new conditions.

The teeth upon the generator may be placed, as shown at Fig. 4, parallel with the axis of the generator, or at any angle therewith which is not the same as the angle at which the teeth on the finished file will stand relatively to the axis of the file, in which case the axis upon which the generator revolves should be adjusted at such an angle with the axis of the file-blank, when mounted in the machine, that the teeth produced upon the file-blank will stand at the desired angle to the axis of the blank. In this case my invention will be employed, for the reason that the vertical planes in which the tooth-forming generator revolves will be oblique to the vertical plane passing through the axis of the file-blank and its path of movement when on the bed underneath the generator, and it will not be necessary to re-form the teeth after they are made by changing the angle of inclination of the generator to the axis of the cut file-blank and repeating the tooth-forming process. In all cases, however, I prefer, after the surface of the blank has been covered with teeth, to sharpen their tops by repeating the process which formed the teeth, with the generator set at a different angle sufficient in the particular case to dress off and sharpen the cutting-edges of the teeth.

The tooth-forming cylinder G is mounted, as already understood, on axle-bearings upon which it can turn freely in a holder, H. This holder is in turn connected to an arm, H′, by means of a cylindrical shank, h, which extends through and beyond a cylindrical hole near the end of said arm, and the end of this shank is threaded, so that the holder H can be secured to the arm by a nut, h′, and also be adjusted so that the axis of the tooth-forming tool G can be set at any desired angle relatively to the longitudinal axis of the file-blank. The arm H′, carrying the tool-holder, is clamp-fastened or otherwise firmly secured to a rock-shaft, J, which is supported in the standard J′. A spring-bar, K, is fastened to one end of the rock-shaft, and is connected at the other end with a lever, L, by a rod, l, as shown at Fig. 1. This lever is furnished with a handle, by which the spring-bar K can be bent, and consequently the tooth-forming tool be made to press upon the surface of the blank to be cut, as clearly indicated at Fig. 1, and suitable means for latching the lever—such, for example, as shown at N, Fig. 1—exist for holding the lever at any desired place. When the lever is released the coiled spring N, which has been compressed by the act of depressing the lever L, reacts and causes the tooth-forming tool to be raised clear of the blank.

The operation of the machine is as follows: The blank a having been secured upon the rolling-bed b, and the parts of the machine being in position, as shown at Fig. 1, motion is given to the pulley F by a belt or other means. This causes the bed b to take a reciprocatory movement underneath the tooth-forming tool, which latter, by the spring-pressure of the bar K, is made to bear upon the surface of the blank and throw up, by the operation of rolling from the heel of the blank to the point, teeth upon the surface of the blank. This operation can be repeated under the yielding pressure described, which can be varied at pleasure by adjusting nuts l′ on the rod l until the teeth on the file-blank are thrown up or molded of full size.

It is obvious that it is not necessary that the tooth-generator should be stationary and the bed supporting the blank be movable relatively thereto, or that the axis of the generator should alone be adjustable relatively to the path of movement of the bed, but the same mode of operation in forming and shaping file-teeth will be accomplished if in the machine the bed supporting the blank be stationary and the generator be made to travel under pressure over the surface of the blank, or if the bed be adjustable as to its path of travel relatively to a generator fixed in position.

What I claim as my invention, and desire to secure by Letters Patent, is—

1. The improved process, substantially as hereinbefore described, for forming teeth upon file-blanks, which consists in causing a tooth-generating tool, constructed as described, to be rolled under pressure over the surface of the blanks under an arrangement in which the vertical planes in which the generator revolves are oblique to a vertical plane passing through the longitudinal axis of the file-blank.

2. The combination, substantially as before set forth, of a tooth-generating tool constructed as described, a bed upon which the file-blank is secured, suitable mechanism, as described, for causing the surface of the blank to be traversed by the tooth-generator, suitable means, as described, for adjusting the tooth-generator and the bed for the blank relatively to each other, so that the vertical planes in which the generator revolves and the vertical plane through the axis of the file-blank shall intersect, and suitable means, as described, for causing the generator to exert pressure upon the blank during the formation of the teeth thereon.

WILLIAM T. NICHOLSON.

Witnesses:
W. H. THURSTON,
I. KNIGHT.